US007357395B2

United States Patent
Brandenburger

(10) Patent No.: US 7,357,395 B2
(45) Date of Patent: Apr. 15, 2008

(54) DEVICE FOR CONTROLLING SUSPENSION PERFORMANCE OF A VEHICLE HAVING VARIABLE AXLE LOADS

(75) Inventor: Walter Brandenburger, Neuss (DE)

(73) Assignee: Carl Freudenberg KG, Weinheim (DE)

( * ) Notice: Subject to any disclaimer, the term of this patent is extended or adjusted under 35 U.S.C. 154(b) by 670 days.

(21) Appl. No.: 10/916,938

(22) Filed: Aug. 12, 2004

(65) Prior Publication Data
US 2005/0040610 A1   Feb. 24, 2005

(30) Foreign Application Priority Data
Aug. 19, 2003   (DE) ................. 103 38 534

(51) Int. Cl.
B60G 17/056   (2006.01)
(52) U.S. Cl. .............. 280/5.514; 280/124.157; 280/5.5; 280/6.159
(58) Field of Classification Search ......... 280/124.157, 280/124.158, 124.159, 124.16, 124.161, 280/6.157, 6.15, 5.519, 6.159
See application file for complete search history.

(56) References Cited

U.S. PATENT DOCUMENTS

| | | | | |
|---|---|---|---|---|
| 5,338,010 | A * | 8/1994 | Haupt ................. | 267/64.16 |
| 6,116,618 | A * | 9/2000 | Shono et al. .......... | 280/5.501 |
| 6,308,973 | B1 * | 10/2001 | Griebel et al. ....... | 280/124.159 |
| 6,394,238 | B1 * | 5/2002 | Rogala ................ | 188/266.2 |
| 6,513,820 | B2 * | 2/2003 | Schoop ............... | 280/124.157 |
| 6,578,855 | B2 * | 6/2003 | Wallestad ........... | 280/6.157 |
| 6,786,492 | B2 * | 9/2004 | Brandenburger ...... | 280/5.519 |
| 6,817,600 | B2 * | 11/2004 | Ocker et al. ........ | 267/274 |
| 6,948,580 | B2 * | 9/2005 | Scholten et al. .... | 180/89.14 |
| 7,048,280 | B2 * | 5/2006 | Brandenburger ...... | 280/5.519 |
| 7,163,208 | B2 * | 1/2007 | Brandenburger ...... | 280/6.159 |
| 2002/0171209 | A1 * | 11/2002 | Brandenburger ...... | 280/5.519 |
| 2003/0122329 | A1 * | 7/2003 | Lin et al. .......... | 280/6.15 |
| 2004/0160032 | A1 * | 8/2004 | Brandenburger ..... | 280/124.159 |

(Continued)

FOREIGN PATENT DOCUMENTS

DE   41 20 758   1/1992   ............ 267/64.16

(Continued)

Primary Examiner—Eric Culbreth
Assistant Examiner—Karen Jane J. Amores
(74) Attorney, Agent, or Firm—Davidson, Davidson & Kappel, LLC

(57) ABSTRACT

A device for controlling suspension performance in a vehicle having variable loads on an axle, a level control system, and a hydropneumatic suspension apparatus between unsprung and sprung masses. The device includes at least one double-acting hydraulic cylinder having a cylinder chamber and a toroid chamber, a pump, a cylinder chamber inlet line connecting the pump to the cylinder chamber, a toroid chamber inlet line connecting the pump to the toroid chamber, and a cylinder chamber outlet line. Two 2/2 port directional control valves configured to regulate the level control system are disposed in the cylinder chamber inlet line and the cylinder chamber outlet line, respectively. A pilot valve is disposed in the toroid chamber inlet line and dependent on a pressure level in the cylinder chamber inlet line. A two-stage pressure control valve is disposed downstream of the pilot valve and configured to regulate a toroid pressure level in the toroid chamber as a function of a cylinder pressure level in the cylinder chamber so that the toroid pressure is increased when the cylinder pressure is low.

9 Claims, 1 Drawing Sheet

U.S. PATENT DOCUMENTS

2005/0258607 A1* 11/2005 Brandenburger ......... 280/5.519
2007/0029741 A1* 2/2007 Schroder ................. 280/6.159

FOREIGN PATENT DOCUMENTS

| DE | 42 42 448 | 3/1994 | |
| DE | 197 19 077 | 11/1998 | |
| DE | 19811184 | 9/1999 | |
| DE | 101 07 631 | 9/2002 | ............. 280/5.519 |

* cited by examiner

DEVICE FOR CONTROLLING SUSPENSION PERFORMANCE OF A VEHICLE HAVING VARIABLE AXLE LOADS

Priority is claimed to German Patent Application No. DE 103 38 534.7, filed on Aug. 19, 2003, which is incorporated by reference herein.

The present invention relates to a device for controlling suspension performance in a vehicle having variable loads on an axle with a level control and hydropneumatic suspension apparatus between the unsprung and the sprung masses with double-acting hydraulic cylinders having pressure chambers—cylinder chambers and toroid chambers—that are connected to a pump by way of pressure lines with the pressure level in the toroid chambers being regulated as a function of the pressure level in the cylinder chambers and the pressure in the toroid chambers being increased at low pressure in the cylinder chambers.

BACKGROUND

A hydropneumatic suspension system for motor vehicles having large axle load inclinations is described in German Patent Document DE 41 20 758 A1, which is incorporated by reference herein. Double-acting hydraulic cylinders are used in this suspension system, the cylinder chambers of these cylinders on the piston-rod side connected with a first accumulator and the toroid chambers connected to a second accumulator. In this system, a level regulating valve controls the height and a pressure-controlled valve constantly regulates a set pressure ratio between the pressures of the first and the second accumulators as a function of the load on the hydropneumatic actuators. In addition, the pressure control valve is actuated both by the pressure in the pressure line to the cylinder chambers and by the pressure in the pressure line to the toroid chambers.

A more simple embodiment is described in German Patent Document DE 42 42 448 C1, which is incorporated by reference herein, with the advantage that load-sensing pumps can be utilized. Static load changes are also regulated following load changes and subsequent activation and deactivation processes. In this case, a pressure control valve is used to keep the pressure level in the toroid chamber spring circuit constant.

An improvement in convenience is achieved by the apparatus described in German Patent Document DE 197 19 077 A1, which is incorporated by reference herein, and in which a load-matched two-stage pressure control valve is used as the pressure control valve. In this way, it is possible to adjust the suspension system better to the load surges.

In addition, a device is known from German Patent Document DE 101 07 631 A1, which is incorporated by reference herein, and in which a pressure control valve is regulated by a pilot valve actuated by the inlet pressure to the piston chambers and, if the inlet pressure in the inlet line to the piston chambers drops below a specified value, a switch is made to a higher control stage. In this way, the pressure in the toroid chambers of the spring cylinder can be increased in the low load range on the front axle.

SUMMARY OF THE INVENTION

An object of the present invention is to provide a device that regulates a high pressure level in the toroid chambers for low cylinder pressure and reduces this pressure level for medium and high pressure levels. A further or alternate object of the present invention is to provide such a device having a simple construction and/or being inexpensive to manufacture.

The present invention provides a device in which the level is regulated by way of two 2/2-port directional control valves that are inserted in the inlet and drain lines of the cylinder chambers of the hydraulic cylinders and in that the pressure level in the toroid chambers of the hydraulic cylinders is regulated by way of a two-stage pressure control valve inserted in the inlet line to the toroid chambers of the spring cylinders. This two-stage pressure control valve is connected downstream of a pilot valve that is dependent on the pressure level in the inlet line. This measure makes it possible to create a device that regulates a high pressure level in the toroid chambers for low cylinder pressure and reduces this pressure level for medium and high pressure levels. The device is furthermore inexpensive in its construction.

The pump is designed such that, during every control action of the level control system, it provides its maximum pump capacity, that is, it operates at maximum pressure.

Throttles having different cross sections are inserted into the inlet line and into the drain line of the cylinder chambers to regulate the volume flows in the lines.

A check valve that can be opened is preferably inserted into the inlet line to the toroid chambers of the hydraulic cylinders between the two-stage pressure control valve and the toroid chambers. This check valve maintains the pressure in the toroid chambers until an opening is created by way of a control line. A spool valve that opens a passage to the drain line is connected to the control line leading to the pump.

Downstream of the throttle contained in the inlet line is a control line leading to the pilot valve. As result of this, the pilot valve is closed in its initial position at low pressure in the inlet line; it attains its center position at medium pressure and reaches its final position under high pressure.

BRIEF DESCRIPTION OF THE DRAWING

The present invention is described in more detail below using an exemplary embodiment depicted in the drawing, in which.

DETAILED DESCRIPTION

Figure 1:
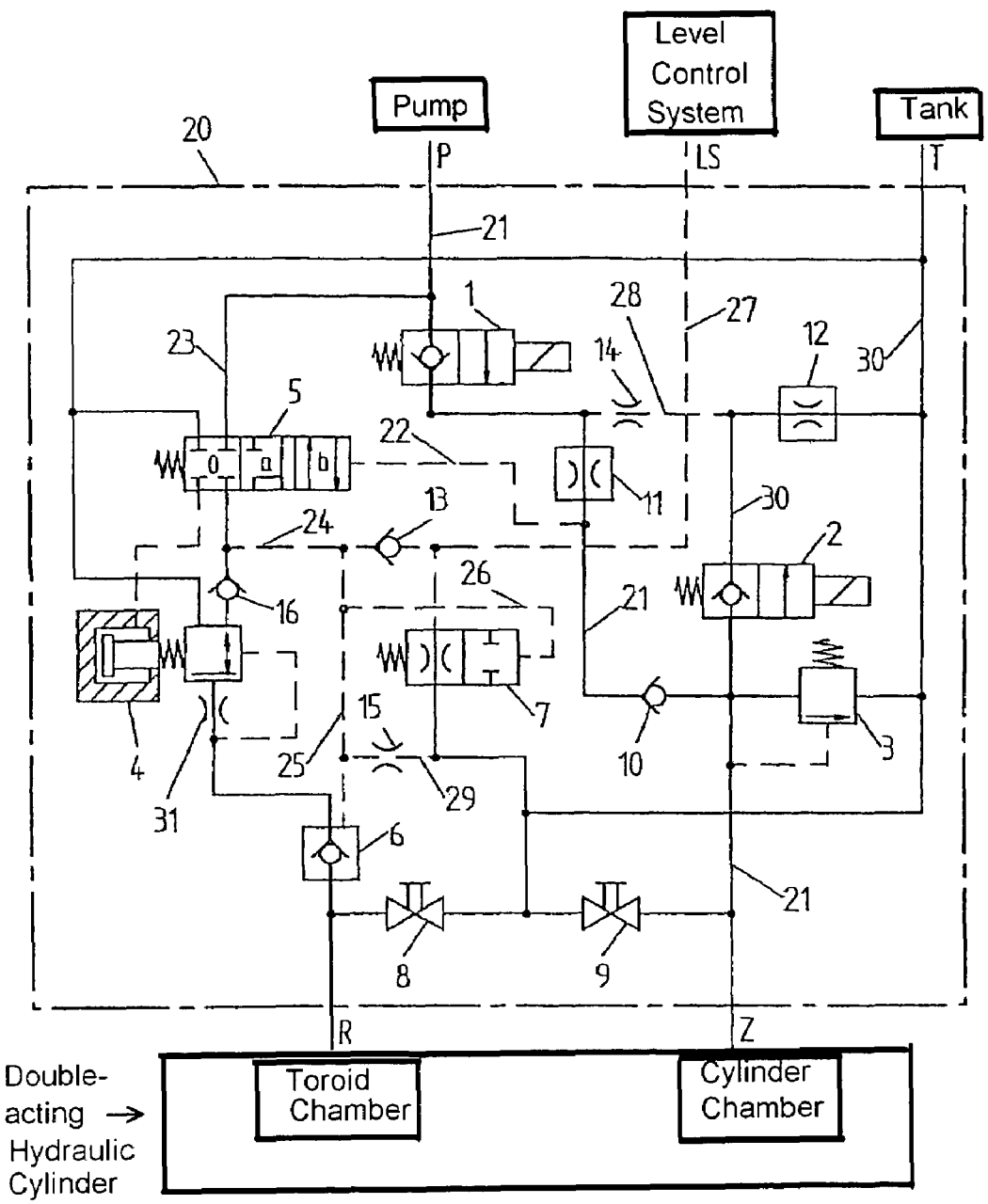
FIG. 1 shows a circuit diagram of the device according to the present invention.

In FIG. 1, the device is indicated schematically by the dashed line 20. A pump, a drain tank and the spring cylinders with the connected hydropneumatic pressure accumulators can be attached to the device. The port leading to the pump is marked P, the port to the tank is marked T and the ports to the toroid chambers or the cylinder chambers of the spring cylinders are marked with R and Z, respectively. The 2/2-port directional control valve 1 is used in the line 21 coming from the pump. In the position shown in the drawing, no power is supplied to the directional control valve 1, and the line 21 is closed. The valve assumes this position if the pistons of the spring cylinders are in their neutral position. It should be noted that the figure illustrates this neutral position for all valves, slide valves and like depicted.

If the vehicle body is lowered and activation is to be performed, power is applied to the valve 1 thereby opening the inlet line 21. The fluid under pressure coming from the pump then flows through the nozzle 11 and the check valve 10 to the cylinder chambers of the spring cylinders. The control line 22, which is connected to the pilot valve 5, is connected to the inlet line 21 downstream of the nozzle 11. The pilot valve 5 is pressed into position a or b by the increased pressure in the control line 22, thus connecting the 2/2-port staged pressure control valve 4 to the inlet line 21 by way of the line 23. In the middle position—position a—at a low pressure level, the pressure control valve 4 receives, by way of the check valve 16, the supply pressure and the control pressure to regulate a high pressure level. The control line 24 is connected to the line 23 upstream of the check valve 16. The control line 24 is connected by way of the line 25 to a check valve 6 that can be opened. The check valve 6 is opened and flow from the toroid chambers is free to flow to the pressure control valve 4. The additional control line 26 is attached to line 25. The control line 26 leads to the spool valve 7 and blocks the pressure relief of the LS control line. An additional pressure increase in the control line 24 opens the check valve 13, and the pressure is increased in the control line 27, this pressure increase regulating the pump to its maximum pressure level. The nozzle 11 determines the quantity of oil under pressure that flows into the cylinder chambers of the spring cylinders. The pressure level to be set at medium and high axle load causes the pilot valve 5 to reach its third position—position b—thereby causing the control pressure on the pressure control valve 4 to drop. In this way, a low pressure level is regulated in the toroid chambers. After the target position of the vehicle is achieved, power to the directional control valve 1 is cut. The bypass lines 28 and 29 in which the nozzles 14 and 15 are inserted are provided for the purpose of pressure relief so that the lines contained in the spring circuit of the toroid chambers can be quickly closed and the control pressure in the LS line can be relieved. The bypass line 28 connects the inlet line 21 to the drain line 30 to the tank, and the bypass line 29 connects the control line 25 to the tank as well. As soon as the control lines 24 and 26 are depressurized, the spool valve 7 opens the connection to the tank and pressure can be relieved from the LS control line 27.

For the deactivation process, power is applied to the 2/2-port directional control valve 2 thereby connecting the cylinder chambers of the spring cylinders to the tank by way of the line 30. The oil under pressure flows through the opened valve 2 to the nozzle 12 where it builds up to the pressure level of the cylinder chambers. As result of the built-up pressure, oil under pressure reaches the pilot valve 5 by way of the nozzle 14 and the nozzle 11. In this way, the pump pressure is fed into the LS control line so that the pump supplies the maximum pressure and the two-stage pressure control valve 4 controls the pressure as a function of the position of the pilot valve 5, which is switched into position a or b depending on the pressure level. The cross section of the nozzle 12 specifies the deactivation control volume. After the desired position is achieved, power to the 2/2-port directional control valve 2 is cut and the draining of oil under pressure from port Z is interrupted. The pressure in the control lines 24, 25 and 26 decreases by way of the nozzles 14 and 15, and the check valve 6 closes. The pilot valve 5 returns to its initial position and closes off the supply of oil under pressure to valve 4. The pressure in the LS control line 27 can be relieved by way of the spool valve 7. The pressure limiting valve 3 is inserted in the spring circuit, this valve being used to protect the spring accumulators. The nozzle 31 attached to the two-stage pressure control valve 4 determines the toroid chamber control volumes for inlet and drain. The service screws 8 and 9 are intended to relieve pressure before work is performed on the device.

What is claimed is:

1. A device for controlling suspension performance in a vehicle having variable loads on an axle, the vehicle including a level control system and a hydropneumatic suspension apparatus between unsprung and sprung masses, the device comprising:
    at least one double-acting hydraulic cylinder having a cylinder chamber and a toroid chamber;
    a pump;
    a cylinder chamber inlet line connecting the pump to the cylinder chamber;
    a toroid chamber inlet line connecting the pump to the toroid chamber;
    a cylinder chamber outlet line;
    two 2/2 port directional control valves configured to regulate the level control system and disposed in the cylinder chamber inlet line and the cylinder chamber outlet line, respectively;
    a pilot valve disposed in the toroid chamber inlet line and dependent on a pressure level in the cylinder chamber inlet line; and
    a two-stage pressure control valve disposed downstream of the pilot valve and configured to regulate a toroid pressure level in the toroid chamber as a function of a cylinder pressure level in the cylinder chamber so that the toroid pressure is increased when the cylinder pressure is low.

2. The device as recited in claim 1, wherein the axle is the front axle.

3. The device as recited in claim 1, wherein the pump runs at a maximum pumping capacity during each regulation of the level control system.

4. The device as recited in claim 1, further comprising a inlet throttle disposed in the cylinder chamber inlet line and an outlet throttle, having a different cross-section as the inlet throttle, disposed in the cylinder chamber outlet line.

5. The device as recited in claim 1, further comprising a check valve disposed in the toroid chamber inlet between the two-stage pressure control valve and the toroid chamber.

6. The device as recited in claim 1, further comprising an LS control line to the pump and a spool valve disposed in the LS control line.

7. The device as recited in claim 6, wherein the spool valve is capable of relieving pressure in the LS control line to the tank.

8. The device as recited in claim 4, further comprising a control line connects the cylinder chamber inlet line to the pilot valve downstream of the inlet throttle.

9. The device as recited in claim 8, wherein the pilot valve adopts in a neutral position when the pressure level in the cylinder chamber inlet line is being relieved, adopts a middle position when the pressure level is low pressure, and adopts an end position when the pressure level is one of medium and high.

* * * * *